J. CRESS.
AUTOMOBILE TRANSMISSION MECHANISM.
APPLICATION FILED JUNE 7, 1915.
1,197,448.
Patented Sept. 5, 1916.
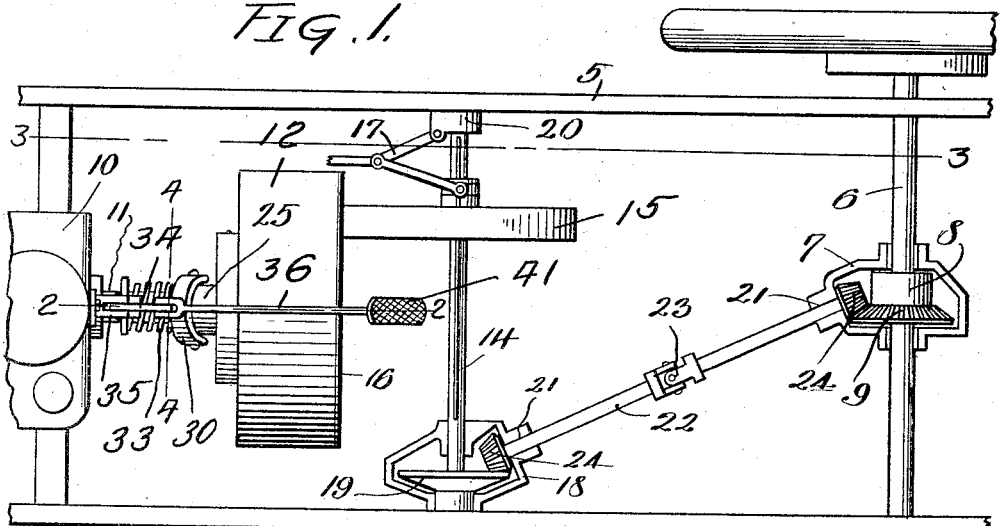
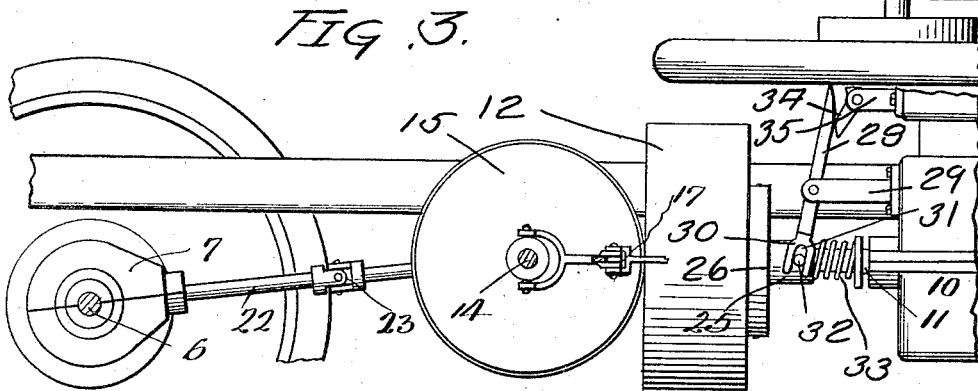
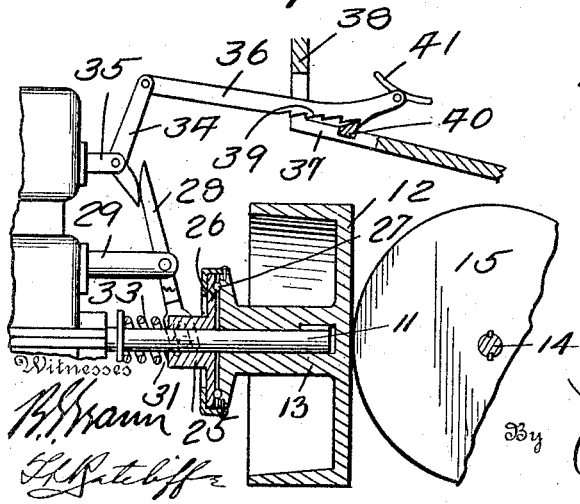
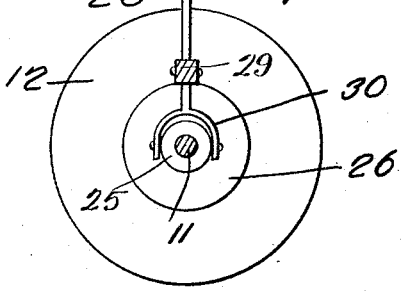
Inventor
J. Cress

UNITED STATES PATENT OFFICE.

JOHN CRESS, OF BELLINGHAM, WASHINGTON.

AUTOMOBILE TRANSMISSION MECHANISM.

1,197,448. Specification of Letters Patent. Patented Sept. 5, 1916.

Application filed June 7, 1915. Serial No. 32,664.

*To all whom it may concern:*

Be it known that I, JOHN CRESS, a citizen of the United States, residing at Bellingham, in the county of Whatcom, State of Washington, have invented certain new and useful Improvements in Automobile Transmission Mechanism; and I do hereby declare the following to be a full, clear, and exact description of the invention, such as will enable others skilled in the art to which it appertains to make and use the same.

This invention relates to new and useful improvements in automobile transmission mechanisms of the friction disk type and has for its object to generally improve the structure and efficiency of mechanisms of this character.

It is more specifically an object to provide in a transmission mechanism of the friction disk type, a drive means for the propeller shaft of the machine which eliminates the use of the objectionable chain drive mechanisms and which permits forward and reverse movements to be transmitted to the propeller shaft with the use of but one friction disk engaging the drive disk, this operation further being accomplished with the use of a drive means imparting the power directly to the drive gear of the differential mechanism.

It is further an object to provide means in a transmission mechanism of the class described whereby the frictional relation of the friction disks may be adjusted to compensate for wear, this adjusting means further serving as an emergency device for allowing the engine shaft to run idle.

With the above and other objects and advantages in view, the invention resides more particularly in the novel combination, formation and arrangement of parts more fully described hereinafter and pointed out in the appended claim.

Reference is had to the accompanying drawings, wherein similar characters of reference designate corresponding parts throughout the several views, and Figure 1 is a top plan view of the improved automobile transmission structure. Fig. 2 is a longitudinal sectional view taken on the line 2—2 of Fig. 1, Fig. 3 is a side view of the structure shown in Fig. 1, and Fig. 4 is a transverse sectional view on the line 4—4 of Fig. 1.

Referring more particularly to the accompanying drawing, 5 designates each of the side sills of an automobile chassis and 6 the rear or propeller axle thereof which is intermediately provided with a housing 7 in which is disposed a differential gearing 8 including the gear wheel 9 which receives the power. An engine 10 is shown forwardly with relation to the chassis and carries a drive shaft 11 on which is mounted a fly wheel 12 including a hub portion 13 splined to slide longitudinally on the shaft. An intermediate transverse shaft 14 is provided on which is splined or otherwise suitably secured a sliding friction disk 15 which engages the end friction face 16 of the fly wheel to receive power therefrom, this disk 15 being movable on the transverse shaft 14, by a suitable series of levers 17 preferably of a conventional type, to vary the speed at which it is driven from the fly wheel, this disk as shown being movable across the axis of rotation of the fly wheel to impart a reverse motion.

One end of the transverse shaft 14 has a bearing in a housing 18 secured to one of the sills of the chassis and fixed on this shaft within the housing is a gear wheel 19, the other end of the shaft 14 being journaled in a suitable bearing 20 carried by the other sill. The housings 7 and 18 are provided with alining bores 21 which form bearings for the ends of a connecting shaft member 22 which includes a pair of sections connected by the universal joint 23. Gears 24 are carried at the ends of the shaft member and meshed with the gear wheels 9 and 19. This shaft member 22 is thus disposed in a diagonal manner with relation to the chassis.

A structure has thus been provided wherein forward and reverse transmitted movements may be imparted to the drive axle of the machine by the use of only one friction disk member and in a manner which eliminates the necessity of a chain drive and which provides a drive at the differential carried intermediately by the rear axle structure.

The fly wheel 12, which as stated, forms also the drive wheel has been described as splined on the engine shaft 11, and to hold this wheel in engagement with the friction disk 15 and move it with relation thereto to compensate for wear, a sleeve member 25 is mounted loosely on the shaft 11 and is provided with an end flange 26 engaging against ball bearings 27 which are held by the engaging faces of the said flange and the hub 13 of the wheel. This sleeve member is actuated and controlled by a lever 28 which is intermediately pivoted to a bracket arm 29 extending outwardly from the engine body or any other suitable support. The lower end of the lever is bifurcated at 30 to embrace the sleeve member and these furcations are provided with open longitudinal slots 31 which slidably engage pins 32 extending outwardly from the sleeve whereby upon rocking the lever, the sleeve will be moved. The sleeve is normally urged to force the wheel 12 against the wheel 15 by a spring 33 surrounding the drive shaft and bearing against said sleeve. Means for rocking the lever 28 to retract the sleeve and permit the wheel 12 to disengage from the wheel 15 to form a means for shutting off the power comprises an angular lever 34 pivoted at its angle to a suitable bracket 35 and bearing at one end against the lever 28. Pivoted to the other end of the lever is an operating link 36 which extends through an opening 37 in the dash 38 of the automobile and which is adapted to be held against undesired movement by engagement selectively of ratchet teeth 39 formed on its bottom edge with a toothed member 40 carried by the automobile body. This link is adapted to be operated by a pivoted foot pedal 41 carried at its end. Thus should it be desired to disconnect the drive shaft of the engine the link 36 is moved upwardly to disengage its ratchet teeth 37 and then pushed forwardly to rock the levers 34 and 28 and retract the sleeve.

While I have illustrated and described a particular embodiment of my invention, I have merely done so for the sake of convenience and I do not wish to be limited to that particular embodiment of my invention as it is obvious that numerous changes may be made within the details of construction thereof without in any way departing from the spirit of the invention or exceeding the scope of the appended claim.

What I claim is:—

In a device of the class described, the combination with an automobile dash and a movable drive wheel disposed forwardly thereof, a spring urging the drive wheel in one direction, of a member engaging said wheel to urge it in the other direction, an intermediately pivoted lever engaging said member, a second intermediately pivoted lever engaging said first lever, a link pivoted to the second lever and extending through the dash, and means on the dash for holding said link against movement to rock said levers for retracting the said member.

In testimony whereof, I affix my signature, in the presence of two witnesses.

JOHN CRESS.

Witnesses:
 E. A. ERIKSSON,
 OWEN LITTLE.